US005542167A

United States Patent [19]

Nakamoto

[11] Patent Number: 5,542,167

[45] Date of Patent: Aug. 6, 1996

[54] DEVICE FOR ATTACHING/DETACHING SHAFT SNAP RING AND HOLE SNAP RING

[75] Inventor: Takayuki Nakamoto, Tokyo, Japan

[73] Assignee: Iwata Denko Co., Ltd., Tokyo, Japan

[21] Appl. No.: 391,030

[22] Filed: Feb. 21, 1995

[30] Foreign Application Priority Data

Oct. 14, 1994 [JP] Japan .................................... 6-249293

[51] Int. Cl.$^6$ ...................................................... B23P 19/04

[52] U.S. Cl. ................................. 29/229; 81/423; 81/424

[58] Field of Search ................................ 29/229; 81/300, 81/302, 416, 417, 418, 421, 422, 423, 424; 403/DIG. 7, 324, 326, 322, 118

[56] References Cited

U.S. PATENT DOCUMENTS

| | | | |
|---|---|---|---|
| 1,617,354 | 2/1927 | Reynolds | 81/423 |
| 2,614,894 | 10/1952 | Brock | 81/418 |
| 3,040,420 | 6/1962 | Kulp | 81/302 |
| 3,044,081 | 7/1962 | Robinson, Jr. | 81/421 |
| 3,383,963 | 5/1968 | Vondrachek | 81/423 |
| 4,280,265 | 7/1981 | Murphy | 29/229 |
| 4,476,750 | 10/1984 | Murphy . | |

*Primary Examiner*—Bruce M. Kisliuk
*Assistant Examiner*—Thomas W. Lynch
*Attorney, Agent, or Firm*—Klauber & Jackson

[57] ABSTRACT

A device for attaching/detaching a snap ring, which can be set up in either of types for shaft and hole applications only by one operation of turning right and left leading portions removably inserted in holes at both ends of a snap ring. Leading portions connected to right and left grasp levers and operating levers are turned around the connecting axes such that locking projections of the leading portions are both directed inward or outward, and rotational shafts removably connected with the leading portions are rotated, so that a right movable pin meshing with a gear portion of one rotational shaft is engaged with a pin hole of the right operating lever and an engaging hole of the right grasp lever while a left movable pin is engaged with a pin hole of the left operating lever and an engaging hole of the left grasp lever, as a result of which the device is set up in the type for shaft application; or a left movable pin is engaged with the pin hole of the left operating lever and an engaging hole of the right grasp lever while a right movable pin is engaged with the pin hole of the right operating lever and an engaging hole of the left grasp lever, as a result of which the device is set up in the type for hole application.

5 Claims, 8 Drawing Sheets

DEVICE FOR ATTACHING/DETACHING SHAFT SNAP RING AND HOLE SNAP RING

FIELD OF THE INVENTION

The present invention relates to a device for attaching/detaching a shaft snap ring into/from a groove of a shaft surface and a hole snap ring into/from a groove of a hole surface.

BACKGROUND OF THE INVENTION

Prior art devices for attaching/detaching snap rings are of two types: one being specialized for attaching/detaching a shaft snap ring into/from a groove of a shaft surface by extending an interval between both ends of the shaft snap ring; and the other being specialized for attaching/detaching a hole snap ring into/from a groove of a hole surface by narrowing an interval between both ends of the hole snap ring.

Specifically, in the device specialized for attaching/detaching a shaft snap ring, levers each of which is continuously formed in an approximately dogleg shape from a locking projection on a leading side to a grasp portion on a root side, are disposed to be symmetric with each other. The levers are connected to each other such that both the locking projections are parallel to each other, with the bent portions of the levers being rotatably supported. Both the locking projections are curved outward, that is, in the direction where they are separated from each other. In operation of the device, the locking projections are inserted in holes formed at both the ends of a snap ring and then moved apart from each other by tightening of grasp portions, so that an interval between both the ends of the snap ring is extended by the movement of the locking projections. At this time, since the locking projections are curved outward, the locking relationship between the holes of the snap ring and the locking projections is prevented from being released, thus certainly attaching/detaching the shaft snap ring into/from a groove of a shaft surface.

The device specialized for attaching/detaching a hole snap ring has a pair of right and left levers, each of which has a locking projection on the leading side and a grasp portion on the root side. The levers are crossed to each other in an X-shape, and they are connected to each other with the crossing portions being rotatably supported. Both the locking projections are curved inward, that is, in the direction where they come closer to each other. In operation of the device, the locking projections are inserted in holes of a snap ring and then moved nearer to each other by tightening of grasp portions, so that an interval between both the ends of the snap ring is narrowed by the movement of the locking projections. At this time, since the locking projections are curved inward, the locking relationship between the holes of the snap ring and the locking projections is prevented from being released, thus certainly attaching/detaching the hole snap ring into/from a groove of a hole surface.

These devices, however, have a disadvantage in that they cannot be commonly used for a shaft snap ring and a hole snap ring.

To cope with such a disadvantage, there has been proposed a device for attaching/detaching a shaft snap ring and a hole snap ring in U.S. Pat. No. 4,476,750 (see FIGS. 20 and 21).

This device can be switched between both types for hole and shaft applications by pushing right and left movable pins 100, 101 in the reversed direction. The device can be set up in the type operable around a supporting shaft 106 for shaft application by integrally connecting a right operating lever 102 to a right grasp lever 103 by means of the right movable pin 100, and a left operating lever 104 to a left grasp lever 105 by means of the left movable pin 101. On the other hand, the device can be set up in the type operable around the supporting shaft 106 for hole application by integrally connecting the left operating lever 104 to the right grasp lever 103 by means of the left movable pin 101, and the right operating lever 102 to the left grasp lever 105 by means of the right movable pin 100. In operation of the device, by tightening of the right and left grasp levers 103, 105, both locking projections 107, 108 provided at the leading edges of the right and left operating levers 102, 104 are moved apart from each other, or nearer to each other.

When a shaft snap ring is attached/detached, the right movable pin 100 is pushed up so as to be engaged with a pin hole 109 of the right operating lever 102 and a right engaging hole 110 of the right grasp lever 103, as a result of which the right operating lever 102 is integrally connected to the right grasp lever 103; whereas the left movable pin 101 is pushed down so as to be engaged with a pin hole 111 of the left operating lever 104 and a left engaging hole 112 of the left grasp lever 105, as a result of which the left operating lever 104 is integrally connected to the left grasp lever 105 (in the state shown by the virtual line in FIG. 21). In such a state, by tightening of the right and left grasp levers 103, 105, both the locking projections 107, 108 are moved apart from each other, so that an interval between both the ends of the snap ring is extended by the movement of both the locking projections 107, 108, thus attaching/detaching the snap ring into/from a groove of a shaft surface.

When a hole snap ring is attached/detached, the left movable pin 101 is pushed up so as to be engaged with a pin hole 111 of the left operating lever 104 and a left engaging hole 113 of the right grasp lever 103, as a result of which the left operating lever 104 is integrally connected to the right grasp lever 103; whereas the right movable pin 100 is pushed down so as to be engaged with a pin hole 109 of the right operating lever 102 and a right engaging hole 114 of the left grasp lever 105, as a result of which the right operating lever 102 is integrally connected with the left grasp lever 105 (in the state shown in FIG. 21). In such a state, by tightening of the right and left grasp levers 103, 105, both the locking projections 107, 108 are moved nearer to each other, so that an interval between both the ends of the snap ring is narrowed by the movement of both the locking projections 107, 108, thus attaching/detaching the snap ring into/from a groove of a hole surface. In this way, a shaft snap ring and a hole snap ring can be attached/detached using only one device.

In addition, as described above, for attaching/detaching a shaft snap ring, the right and left locking projections 107, 108 must be curved outward; whereas for attaching/detaching a hole snap ring, the right and left locking projections 107, 108 must be curved inward. If the directions of the locking projections 107, 108 are not suitably adjusted, there is a fear that the snap ring is slipped and jumped off the locking projections.

For this reason, in accordance with the kind of a snap ring (for shaft or hole application), the device is set up in the type for shaft or hole application by turning the right and left locking projections 107, 108 by 180° around the axial line.

To switch the type of the device, three operations of the right and left locking projections 107, 108 must be performed: (1) loosening screws 115, 116 fixing the locking projections 107, 108; (2) turning the locking projections 107, 108 by 180°; and (3) tightening the screws 115, 116 for fixing the locking projections 107, 108 again.

For switching the type of the device, there is further required an operation of pushing both the movable pins 100, 101. As a result, in the device proposed in U.S. Pat. No. 4,476,750, a shaft snap ring and a hole snap ring can be attached/detached by one device; however, the switching of the type of the device cannot be performed by one operation and takes a lot of labor.

Another problem presents in the directions of the locking projections 107, 108 upon insertion thereof. Upon insertion of the locking projections 107, 108, it must be confirmed whether the locking projections 107, 108 are both directed outward (for shaft application) or inward (for hole application). In this regard, this prior art device has a structure that even if one locking projection is directed outward and the other is directed inward, they are allowed to be inserted, which possibly causes an artificial trouble that the locking projections are inserted in the state that the directions thereof are erroneous. Moreover, if an operator does not know that the right and left locking projections must be adjusted in the state where they are both directed outward or inward, the same trouble is possibly generated.

In this case, as described above, if the directions of the locking projections 107, 108 are not suitably adjusted, there is a fear that the snap ring is slipped and jumped off the locking projections.

SUMMARY OF THE INVENTION

A first object of the present invention is to provide a device for attaching/detached a shaft snap ring and a hole snap ring, which can be set up in the type for shaft or hole application by freely changing both locking projections of right and left leading portions and right and left grasp levers through one operation of turning the right and left leading portions.

A second object is to provide the above device, wherein upon exchange between leading portions having locking projections with different diameters in accordance with a diameter of a snap ring, the leading portion can be certainly inserted in a specified direction even if an operator does not know the directional relationship of the locking projection, and also a rotational shaft to which the leading portion is connected is prevented from being slipped off even in the states after the leading portion is removed and during it is pulled out.

A third object is to provide the above device, wherein the connection between a rotational shaft and a movable pin is kept in a specified meshing relationship.

A fourth object is to provide the above device, wherein the exchange of a leading portion can be performed by a simple pushing/pulling operation, and the leading portion is temporarily fixed in the connecting state.

A fifth object is to provide the above device, wherein the locking projections can be inserted in holes provided at both the ends of the snap ring irrespective of the types for hole and shaft applications, and further they can be stably locked with the snap ring.

To achieve the first object, according to the present invention, there is provided a device for attaching/detaching a snap ring, wherein right and left leading portions connected to right and left grasp levers and right and left operating levers are turned around the connecting axes such that locking projections of the leading portions are both directed inward or outward, and rotational shafts removably connected with the leading portions are rotated, so that a right movable pin meshing with a gear portion of one rotational shaft is engaged with a pin hole of the right operating lever and an engaging hole of the right grasp lever while a left movable pin is engaged with a pin hole of the left operating lever and an engaging hole of the left grasp lever, as a result of which the device is set up in the type for shaft application; or a right movable pin is engaged with the pin hole of the left operating lever and an engaging hole of the right grasp lever while a left movable pin is engaged with the pin hole of the right operating lever and an engaging hole of the left grasp lever, as a result of which the device is set up in the type for hole application.

To achieve the second object, according to the present invention, there is provided a device for attaching/detaching a shaft snap ring and a hole snap ring, wherein the device has slip-off preventive members projecting into guide holes of the right and left operating levers and meshing with annular grooves of the right and left rotational shafts for preventing the slip-off of the right and left rotational shafts without any obstruction of the rotation thereof, and wherein the connection structures between the connection portions of the right and left leading portions and the portions to be connected of the right and left rotational shafts are formed in a male-female relationship in Which each connecting angle around the connecting axial line therebetween is specified such that the leading portions can be connected to the rotational shafts only in a state where right and left locking projections are directed inward or outward.

To achieve the third object, according to the present invention, there is provided a device for attaching/detaching a shaft snap ring and a hole snap ring, wherein gear portions of the right and left rotational shafts mesh with rack portions of right and left movable pins in the pin holes near the guide holes, and rolling elements, in locking slits which axially extend along the pin hole surface and which are formed in the opposite shape to locking recessed portions, are locked with the locking recessed portions on the side surfaces of the right and left movable pins without any obstruction of the axial movement of the movable pins, thereby preventing the rotation and slip-off of the right and left movable pins.

To achieve the fourth object, according to the present invention, there is provided a device for attaching/detaching a shaft snap ring and a hole snap ring, which includes stoppers which project into guide holes of the right and left operating levers and which are elastically engaged with the annular grooves of the shaft portions of the right and left leading portions without any obstruction of the rotation and the slip-off of the leading portions.

To achieve the fifth object, according to the present invention, there is provided a device for attaching/detaching a shaft snap ring and a hole snap ring, wherein each of the locking projections at the right and left leading portions is substantially curved in the range from its base portion to its leading edge along the rotational axial line.

DETAILED DESCRIPTION OF THE INVENTION

(Embodiment 1)

Figure 1:
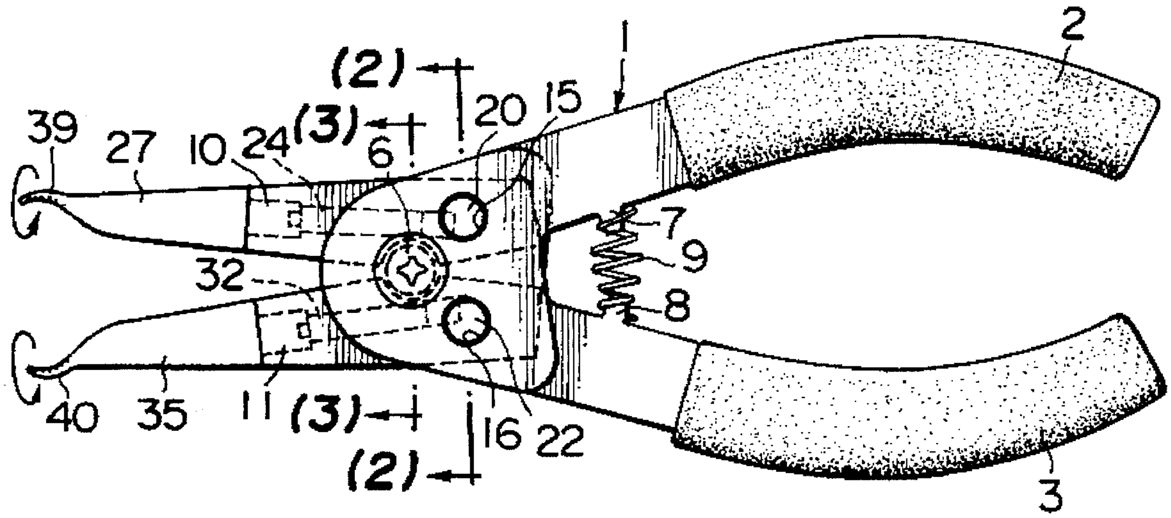
FIG. 1 is a plan view showing a first embodiment of a device for attaching/detaching a shaft snap ring and a hole snap ring according to the present invention.
Figure 2:
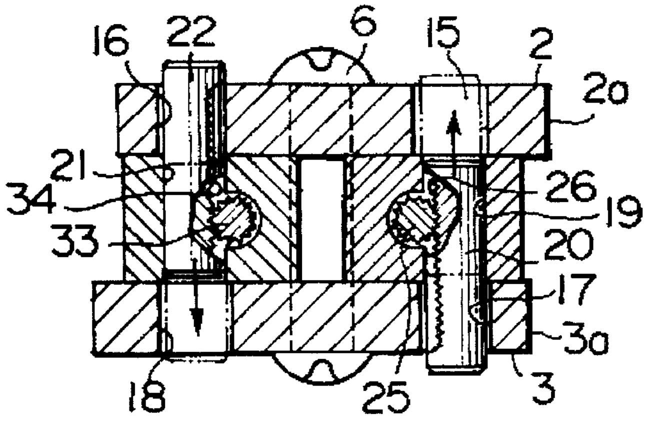
FIG. 2 is an enlarged vertical sectional view taken along the line (2)—(2) of FIG. 1.
Figure 3:
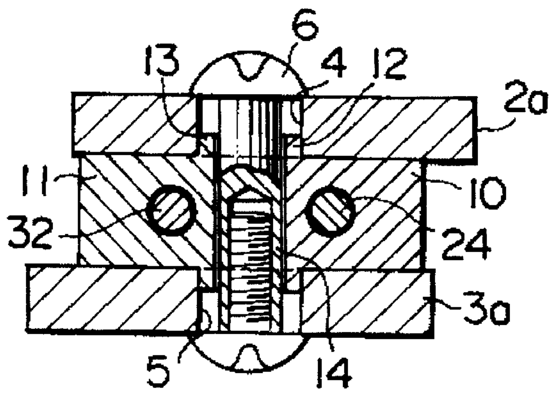
FIG. 3 is an enlarged vertical sectional view taken along the line (3)—(3) of FIG. 1.
Figure 4:
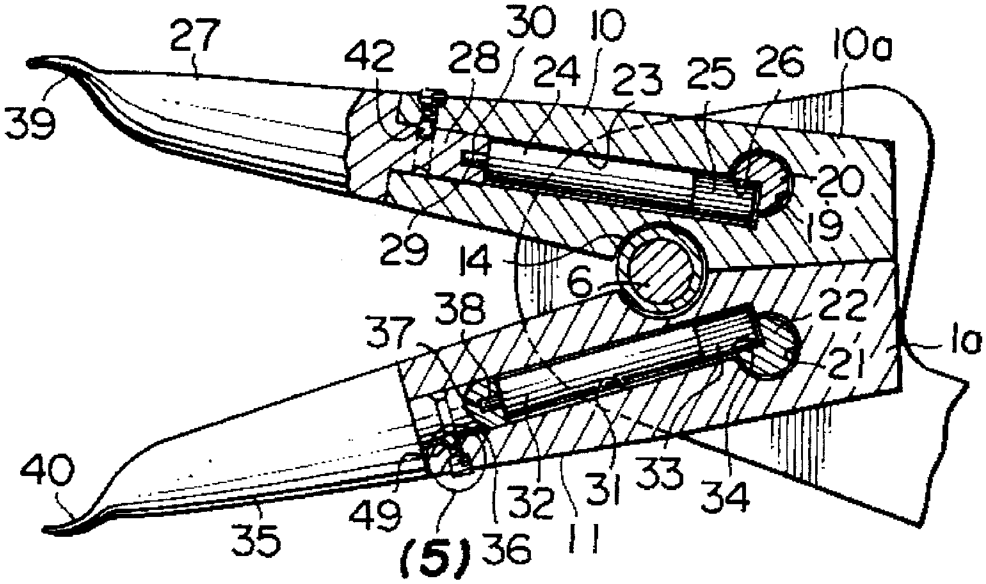
FIG. 4 is a partially enlarged transverse sectional view of the device shown in FIG. 1.
Figure 5:
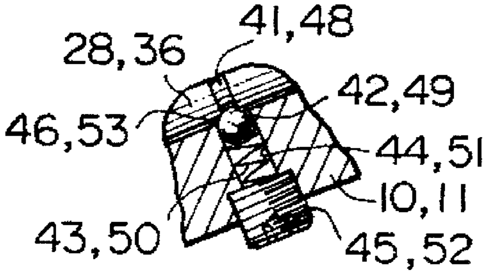
FIG. 5 is a partially enlarged transverse sectional view of a stopper.
Figure 6:
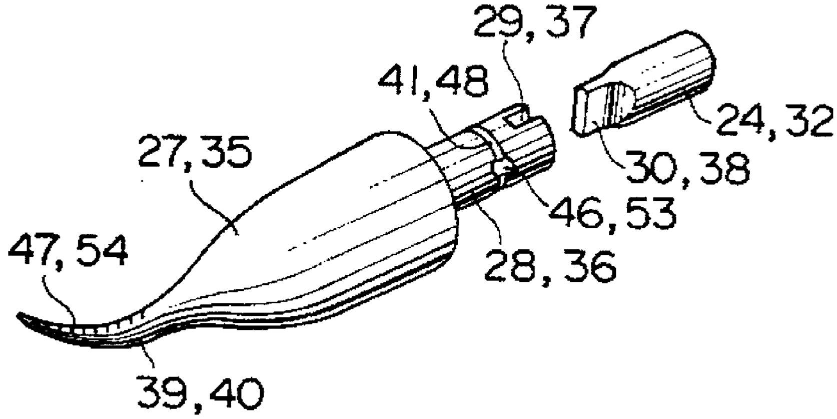
FIG. 6 is a partially enlarged perspective view showing the connection between a leading portion and a rotational shaft.

FIGS. 1 to 11 show a first embodiment of a device for attaching/detaching a shaft snap ring and a hole snap ring according to the present invention. In a device 1, overlapped support portions 2*a*, 3*a* of right and left grasp levers 2, 3 are rotatably supported by a supporting shaft 6 which passes through shaft holes 4, 5 of both leading portions. A coil spring 9 is provided between opposite projections 7, 8 of the right and left grasp levers 2, 3, and by the elastic force of the spring 9, the right and left grasp levers 2, 3 are biased around the supporting shaft 6 in a state being opened in an approximately reverse V-shape.

A root side lever portion 10*a* of a right operating lever 10 and a root side lever portion 11*a* of a left operating lever 11 are interposed in parallel between the overlapped support portions 2*a*, 3*a*. Semi-arcuate shaft portions 12, 13 formed on the opposite sides of the right and left root side lever portions 10*a*, 11*a* are freely fitted in the shaft holes 4, 5, and the supporting shaft 6 passes through a shaft hole 14 formed between the shaft portions 12, 13. The right and left operating levers 10, 11 are swung around the supporting shaft 6 between a state where leading side lever portions 10*b*, 11*b* are made in parallel and a state where they are opened in an approximately V-shape. Namely, the leading side lever portions 10*b*, 11*b* can be freely opened/closed.

At the rotatable support portion 2*a*, right and left engaging holes 15, 16 are formed in two corners of a triangle having the shaft hole 4 as the vertex. Similarly, at the rotatable support portion 3*a*, right and left engaging holes 17, 18 are formed at two corners of a triangle having the shaft hole 5 as the vertex. A right movable pin 20, which is held in a pin hole 19 of the right root side lever portion 10*a*, is axially moved and removably engaged with either of the right engaging holes 15, 17; whereas, a left movable pin 22, which is held in a pin hole 21 of the left root side lever portion 11*a*, is axially moved and removably engaged with either of the left engaging holes 16, 18.

The right operating lever 10 has a guide hole 23 passing from the pin hole 19 to the leading edge of the lever 10. A rotational shaft 24 is contained in the guide hole 23. A gear portion 25 provided at the root side end of the rotational shaft 24 projects into the pin hole 19, and it meshes with a rack portion 26 of the right movable pin 20, so that the right movable pin 20 is moved in the pin hole 19 by the rotation of the rotational shaft 24. A shaft portion 28 of a right leading portion 27 is removably and rotatably inserted in the guide hole 23, and an engaging groove 29 provided at the end of the shaft portion 28 is engaged with an engaging projection 30 provided on the leading side of the rotational shaft 24 so as to be rotatable integrally therewith.

Similarly, a rotational shaft 32 is contained in a guide hole 31 passing from the pin hole 21 to the leading edge of the left operating lever 11. A gear portion 33 provided at the root side end of the rotational shaft 32 meshes with a rack portion 34 of the right movable pin 22. A shaft portion 36 of a right leading portion 35 is inserted in the guide hole 31, and an engaging groove 37 provided at the end of the shaft portion 36 is engaged with an engaging projection 38 provided on the leading side of the rotational shaft 32 so as to be rotatable integrally therewith.

The right leading portion 27 has at its leading edge a locking projection 39 which is substantially curved in the range from its base portion to its leading edge along the rotational axial line. The right leading portion 27 can be changed, by being turned by 180°, between a state where the locking projection 39 is directed outward and a state where it is directed inward. Similarly, the left leading portion 35 has at its leading edge a locking projection 40. The left leading portion 35 can be changed, by being turned by 180°, between a state where the locking projection 40 is directed outward and a state where it is directed inward.

The connecting relationship between the right leading portion 27 and the right movable pin 20 is as follows: As the right leading portion 27 is turned by 180° clockwise or counterclockwise to change the direction of the locking portion 39 from the outward to inward direction, the gear portion 25 integrally connected with the right leading portion 27 is similarly turned by 180° and the right movable pin 20 is moved in the pin hole 19 by the gear portion 25 to be engaged with the pin hole 19 and the right engaging hole 17, as a result of which the right leading portion 27 can be integrally connected with the left grasp lever 3 by way of the right operating lever 10. Meanwhile, as the right leading portion 27 is turned by 180° clockwise or counterclockwise to change the direction of the locking portion 39 from the inward to outward direction, the gear portion 25 integrally connected with the right leading portion 27 is similarly turned by 180° and the right movable pin 20 is moved in the pin hole 19 by the gear portion 25 to be engaged with the pin hole 19 and the right engaging hole 15, as a result of which the right leading portion 27 can be integrally connected with the right grasp lever 2 by way of the right operating lever 10.

Similarly, the connecting relationship between the left leading portion 35 and the left movable pin 22 is as follows: As the left leading portion 35 is turned by 180° clockwise or counterclockwise to change the direction of the locking portion 40 from the outward to inward direction, the gear portion 33 integrally connected with the left leading portion 35 is similarly turned by 180° and the left movable pin 22 is moved in the pin hole 21 by the gear portion 33 to be engaged with the pin hole 21 and the left engaging hole 16, as a result of which the left leading portion 35 can be integrally connected with the right grasp lever 2 by way of the left operating lever 11. Meanwhile, as the left leading portion 35 is turned by 180° clockwise or counterclockwise to change the direction of the locking projection 40 from the inward to outward direction, the gear portion 33 integrally connected with the left leading portion 35 is similarly turned by 180° and the left movable pin 22 is moved in the pin hole 21 by the gear portion 33 to be engaged with the pin hole 21 and the left engaging hole 18, as a result of which the left leading portion 35 can be integrally connected with the left grasp lever 3 by way of the left operating lever 11.

A ball-like stopper 42 on the right operating lever 10 side is pushed by a coil spring 43 to be meshed with an annular groove 41 provided on the shaft surface of the shaft portion 28 of the right leading portion 27. With this stopper 42, the right leading portion 27 is prevented from being slipped-off unless it is forcibly pulled out. The stopper 42 and the spring 43 are held by a screw-like retainer 45 so as not to be slipped off a ball hole 44. In the annular groove 41, engaging recessed portions 46 are provided at a groove portion on the curving side of the locking projection 39 and at a groove portion on the opposite side, so that when the stopper 42 meshes with either of the engaging recessed portions 46, the locking projection 39 is locked in the state where it is directed outward or inward. The locking projection 39 iS formed with fine grooves 47 along the curved inner surface, so that when the snap ring is attached/detached, the locking state between the locking projection 39 and the hole of the snap ring is prevented from being released.

A ball-like stopper 49 on the left operating lever 11 side is pushed by a coil spring 50 to be meshed with an annular groove 48 provided on the shaft surface of the shaft portion 36 of the left leading portion 35. With this stopper 49, the left leading portion 35 is prevented from being slipped-off unless it is forcibly pulled out. The stopper 49 and the spring 50 are held by a screw-like retainer 52 not to be slipped off a ball hole 51. In the annular groove 48, engaging recessed portions 53 are provided at a groove portion on the curving side of the locking projection 40 and at a groove portion on the opposite side, so that when the stopper 49 meshes with either of the engaging recessed portions 53, the locking projection 40 is locked in the state where it is directed outward or inward. The locking projection 40 is formed with fine grooves 54 along the curved inner surface, so that when the snap ring is attached/detached, the locking state between the locking projection 40 and the hole of the snap ring is prevented from being released.

Figure 7A:
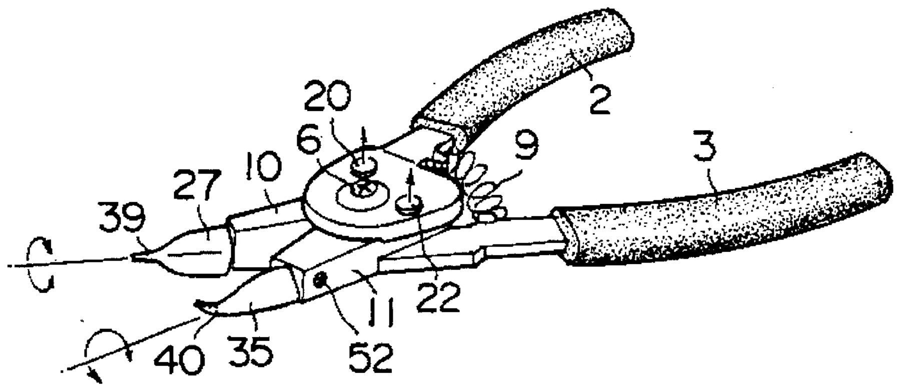
FIG. 7A to 7C are perspective views showing a change in the type of the device by turning of right and left leading portions.
Figure 7B:
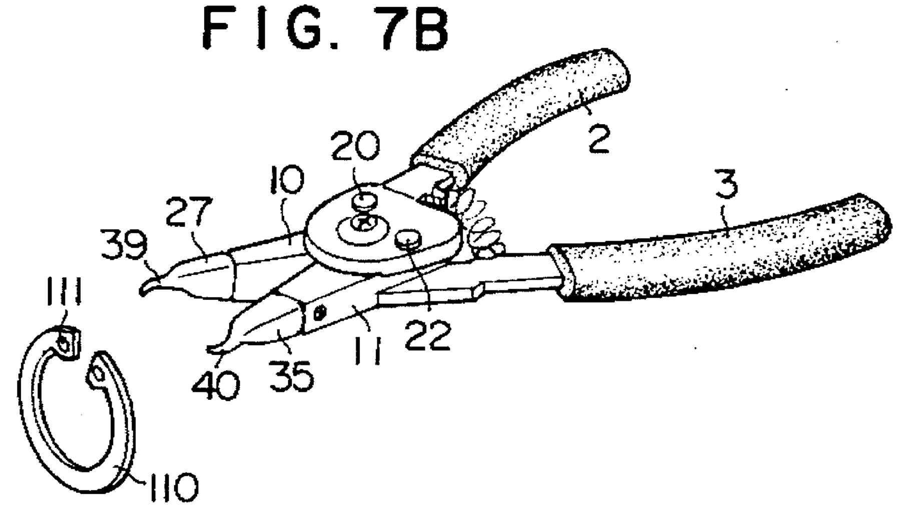
Figure 7C:
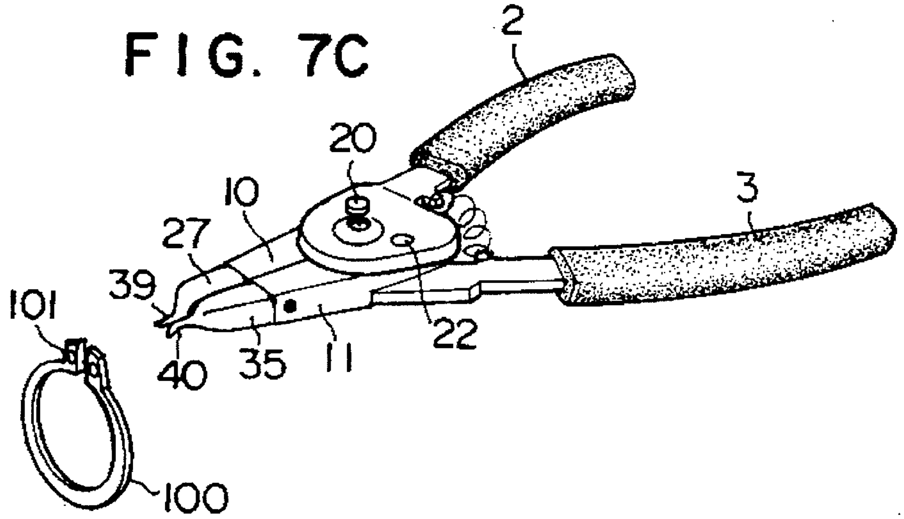

With this construction, by turning the right and left leading portions 27, 35 for directing the locking projections 39, 40 inward for hole application, the connecting relationship between the right and left leading portions 27, 35 and the grasp levers 2, 3 are automatically set for hole application by way of the right and left operating levers 10, 11 (see FIG. 7*b*). On the other hand, by turning the right and left leading portions 27, 35 for directing the locking projections 39, 40 outward for shaft application, the connecting relationship between the right and left leading portions 27, 35 and the grasp levers 2, 3 are automatically set for hole application by way of the right and left operating levers 10, 11 (see FIG. 7*c*).

Figure 8:
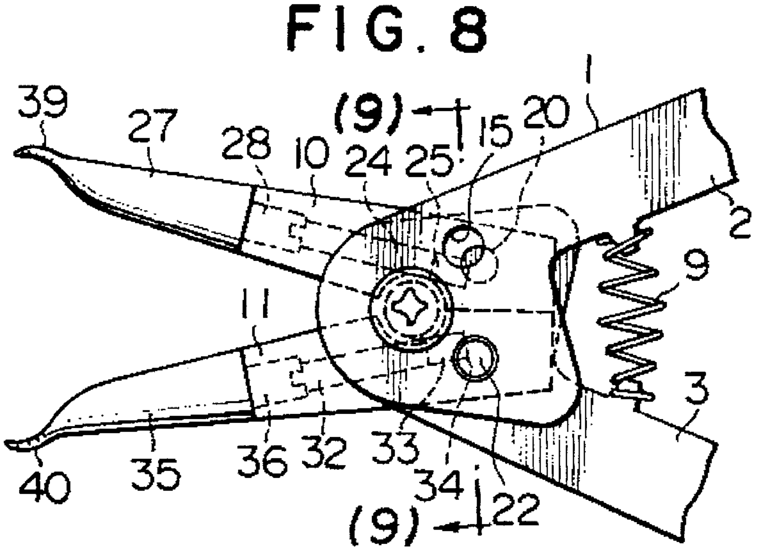
FIG. 8 is a partial plan view showing a state where the device shown in FIG. 1 is set up in the type for hole application.
Figure 9:
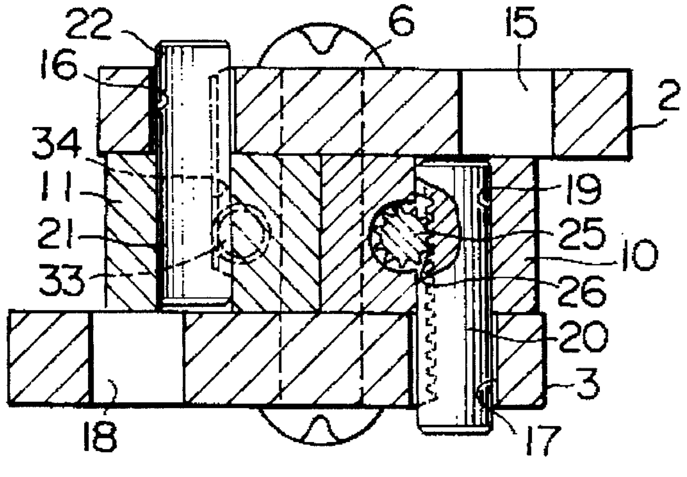
FIG. 9 is an enlarged vertical sectional view taken along the line (9)—(9) of FIG. 8.

FIGS. 8 and 9 show the state where the device 1 is set for hole application.. In these figures, both the locking projections 39, 40 of the right and left leading portions 27, 35 are both directed inward, and the right movable pin 20 integrally connected with the right leading portion 27 is engaged with the pin hole 19 of the right operating lever 10 and the right engaging hole 17 of the left grasp lever 3, as a result of which the right leading portion 27 is integrally connected with the left grasp lever 3 by way of the right operating lever 10. Meanwhile, the left movable pin 22 integrally connected with the left leading portion 35 is engaged with the pin hole 21 of the left operating lever 11 and the left engaging hole 16 of the right grasp lever 2, as a result of which the left leading portion 35 is integrally connected with the right grasp lever 2 by way of the left operating lever 11.

Accordingly, by the operation of grasping the right end left grasp levers 2, 3, inserting the locking projections 39, 40 in the holes 111 provided at the ends of the hole snap ring 110, and tightening the grasp levers 2, 3, an interval between both the ends of the hole snap ring 110 is narrowed. The hole snap ring is thus attached/detached into/from a groove of a hole surface.

Figure 10:
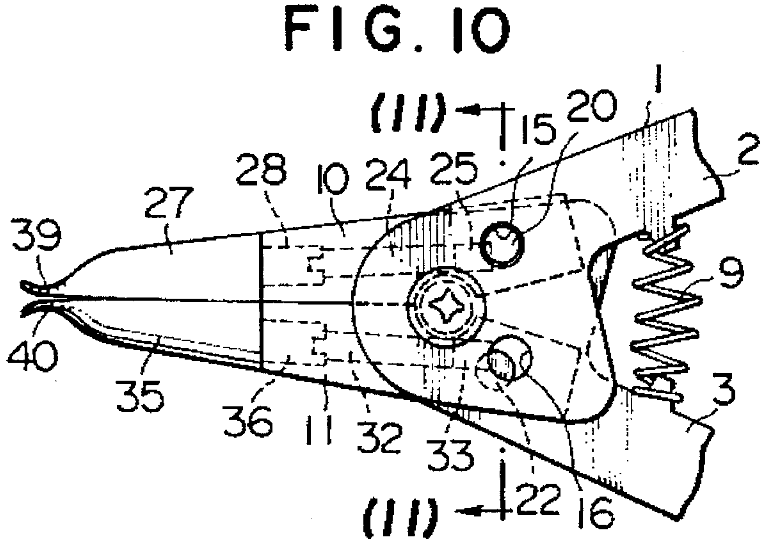
FIG. 10 is partial plan view showing a state where the device shown in FIG. 1 is set up in the type for shaft application.
Figure 11:
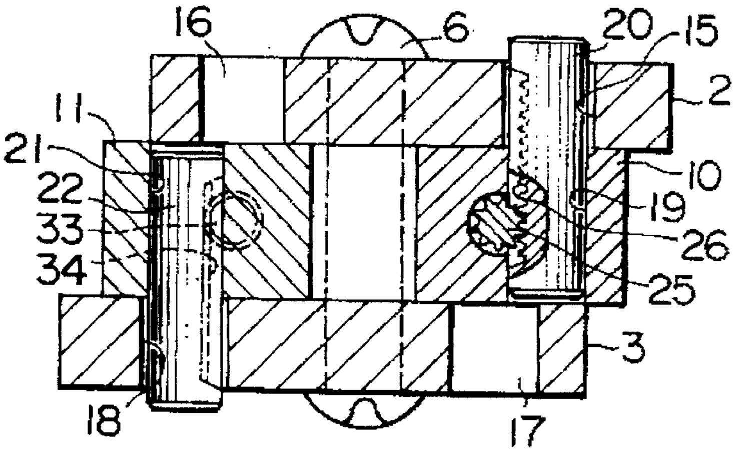
FIG. 11 is an enlarged vertical sectional view taken along the line (11)—(11) of FIG. 10.

FIGS. 10 and 11 show the state that the device 1 is set for shaft application. In these figures, both the locking projections 39, 40 of the right and left leading portions 27, 35 are both directed outward, and the right movable pin 20 integrally connected with the right leading portion 27 is engaged with the pin hole 19 of the right operating lever 10 and the right engaging hole 15 of the right grasp lever 2, as a result of which the right leading portion 27 is integrally connected with the right grasp lever 2 by way of the right operating lever 10. Meanwhile, the left movable pin 22 integrally connected with the left leading portion 35 is engaged with the pin hole 21 of the left operating lever 11 and the left engaging hole 18 of the left grasp lever 3, as a result of which the left leading portion 35 is integrally connected with the left grasp lever 3 by way of the left operating lever 11.

Accordingly, by operation of grasping the right and left grasp levers 2, 3, inserting the locking projections 39, 40 in hole portions 101 provided at the both ends of a shaft snap ring 100, and tightening the grasp levers 2, 3, an interval between both the ends of the shaft snap ring 100 is extended. The shaft snap ring is thus attached/detached into/from a groove of a shaft surface.

The above-described first embodiment has the following effects:

The device 1 can be switched between the types for hole and shaft applications, as follows: For attaching/detaching the shaft snap ring 100, the right and left leading portions 27, 35, which are set for hole application, are turned by 180° to adjust the direction of locking projections 39, 40 outward, and at the same time the right and left movable pins 20, 22 meshing with the gear portions 26, 34 of the rotational shafts 24, 32 connected with the leading portions 27, 35 are reversely moved each other. Thus, the right movable pin 20 is released from the right engaging hole 17 of the left grasp lever 3 and is engaged with the pin hole 19 of the right operating lever 10 and the right engaging hole 15 of the right grasp lever 2 while the left movable pin 22 is released from the left engaging hole 16 of the right grasp lever 2 and is engaged with the pin hole 21 of the left operating lever 11 and the left engaging hole 18 of the left grasp lever 3. The device 1 is thus set up for shaft application.

For attaching/detaching the hole snap ring 110, the right and left leading portions 27, 35, which are set for shaft application, are turned by 180° to adjust the direction of the locking projections 39, 40 inward, and at the same time the right and left movable pin 20, 22 meshing with the gear portions 26, 34 of the rotational shafts 24, 32 connected with the leading portions 27, 35 are moved in the reversed direction to that in the set-up for shaft application. Thus, the left movable pin 22 is released from the left engaging hole 18 of the left grasp lever 3 and is engaged with the pin hole 21 of the left operating lever 11 and the left engaging hole 16 of the right grasp lever 2 while the right movable pin 20 is released from the right engaging hole 15 of the right grasp lever 2 and is engaged with the pin hole 19 of the right operating lever 10 and the right engaging hole 17 of the left grasp lever 3. The device 1 is thus set up for hole application.

In this way, only by turning the right and left leading portions 27, 35 for adjusting the direction of the locking projections 39, 40 inward for hole application or outward for shaft application, the connecting relationship between the right and left leading portions 27, 35 and the right and left grasp levers 2, 3 by way of the right and left operating levers 10, 11 can be automatically set up for hole or shaft application.

The device 1 is easy in handling because it can be simply switched between the types for hole and shaft applications by one operation, and it can be freely used without any skill in operation because there is no inconvenience in the locking relationship between the locking projections 39, 40 and the right end left grasp levers 3, 2.

The right and left leading portions 27, 35 can be suitably exchanged in accordance with the attaching/detaching state of a snap ring and with the size of the snap ring, so that the snap ring can be speedily and accurately attached/detached by selecting the leading portions having locking projections suitable for the snap ring.

The stoppers 42, 49 projecting into the guide holes 23, 31 of the right and left operating levers 10, 11 are elastically locked in the annular grooves 41, 48 of the shaft portions 28, 36 of the right and left leading portions 27, 35 without any obstruction of the rotation and the attachment/detachment of the leading portions 27, 35, so that the shaft portions 28, 36 of the leading portions 27, 35 can be held in the guide holes 23, 31, and can be kept in the state where they are rotatably connected to the shaft portions 24, 32. In addition, the leading portions 27, 35 can be easily exchanged by forcibly pulling out them.

Each of the locking projections 39, 40 of the right and left leading portions 27, 35 is substantially curved in the range from its base portion to its leading edge along the rotational axial line, so that when the locking projections 39, 40 are once inserted in holes of a snap ring, they are difficult to be released therefrom. This makes it possible to prevent an accident that the snap ring is released and jump off the holes, and hence to safely perform the attaching/detaching operation. Moreover, the locking projections 39, 40 can be visually and smoothly inserted in holes of a snap ring irrespective of the type for hole or shaft application.

The fine grooves 47, 54 are formed on the curved inner surfaces of the locking projections 39, 40 for preventing the release of the locking state between the locking projections 39, 40 and holes of a snap ring, so that the attaching/detaching operation can be safely performed.

(Embodiment 2)

FIGS. 12 to 19 show a second embodiment of a device for attaching/detaching any of a shaft snap ring and a hole snap ring according to the present invention. The construction of the second embodiment is basically the same as that of the first embodiment; accordingly, only the different points therebetween will be described.

Connection structures between engaging grooves 29, 37 of right and left leading portions 27, 35 and engaging projections 30, 38 of right and left rotational shafts 24, 32 are formed in a male-female relationship in which each connecting angle around the connecting axial line therebetween is specified such that the leading portions 27, 35 can be connected to the rotational shafts 24, 32 only in a state where right and left locking projections 39, 40 of the leading portion 27, 35 are directed inward or outward.

Specifically, the engaging projection 30 is formed in an approximately trapezoid male shape in section, while the engaging groove 29 is also formed in an approximately trapezoid female shape in section so as to be engaged with the engaging projection 30. Similarly, the engaging projection 38 is formed in an approximately trapezoid male shape in section, while the engaging groove 37 is also formed in an approximately trapezoid female shape in section so as to be engaged with the engaging projection 38. With this structure, the leading portions 27, 35 can be certainly and accurately exchanged while keeping a state where the right and left locking projections 39, 40 are both directed inward or outward.

A ball-like slip-off preventive member 56 meshes with an annular groove portion 55 of the right rotational shaft 24 without any obstruction of the rotation of the rotational shaft 24. The slip-off preventive member 56 projects from a screw hole portion 57 of the right operating lever 10 into a guide hole 23, and pressed by a screw 58 screwed with the screw hole portion 57 to be held in the state meshing with the annular groove portion 55. This is effective to prevent the right rotational shaft 24 from being slipped off the guide hole 23, and to determine the position of the right rotational shaft 24 in the guide hole 23 thereby keeping the meshing relationship between a gear portion 25 and a gear portion 26 of a right movable pin 20.

A ball-like slip-off preventive member 60 meshes with an annular groove portion 59 of the left rotational shaft 32 without any obstruction of the rotation of the rotational shaft 32. The slip-off preventive member 60 projects from a screw hole portion 61 of the left operating lever 11 into a guide hole 31, and pressed by a screw 62 screwed with the screw hole portion 61 to be held in the state meshing with the annular groove portion 59. This is effective to prevent the right rotational shaft 32 from being slipped off the guide hole 31, and to determine the position of the right rotational shaft 32 in the guide hole 31 thereby keeping the meshing relationship between a gear portion 33 and a gear portion 34 of a left movable pin 22.

A ball-like rolling element 64 in a semi-spherical locking recessed portion 63 on the side surface of the right movable pin 20 is locked in a locking slit 65 having a semi-circular section which axially extends along the pin hole 19 surface. The rolling element 64 can be rolled along the locking slit 65 accompanied by the movement of the right movable pin 20 while being kept in the locking recessed portion 63, and can be also rolled until it touches the hole edge of the right engaging hole 15 or 17, thus allowing the right movable pin 20 to be smoothly moved in the axial direction, and preventing the rotation and the slip-off of the right movable pin 20. This makes it possible to keep the meshing relationship between the gear portion 26 and the gear portion 25.

Similarly, a ball-like rolling element 67 in a semi-spherical locking recessed portion 66 on the side surface of the left movable pin 22 is locked in a locking slit 68 having a semi-circular section which axially extends along the pin hole 21 surface. The rolling element 67 can be rolled along the locking slit 68 accompanied by the movement of the left movable pin 22 while being kept in the locking recessed portion 66, and can be also rolled until it touches the hole edge of the left engaging hole 16 or 18, thus allowing the left movable pin 20 to be smoothly moved in the axial direction, and preventing the rotation and the slip-off of the left movable pin 22. This makes it possible to keep the meshing relationship between the gear portion 34 and the gear portion 33.

A stopper 42 on the right operating lever 10 side is pushed by a plate spring 69 fixed by a screw 58 to be elastically meshed with an annular groove 41 of a shaft portion 28 of the right leading portion 27, for preventing the slip-off of the right leading portion 27 until it is forcibly released and keeping the connecting relationship between the leading portion 27 and the rotational shaft 24.

Similarly, a stopper 49 on the right operating lever 11 side is pushed by a plate spring 70 fixed by a screw 62 to be elastically meshed with an annular groove 48 of the shaft portion 36 of the left leading portion 35, for preventing the slip-off of the left leading portion 35 until it is forcibly released and keeping the connecting relationship between the leading portion 35 and the left rotational shaft 32.

Figure 12:
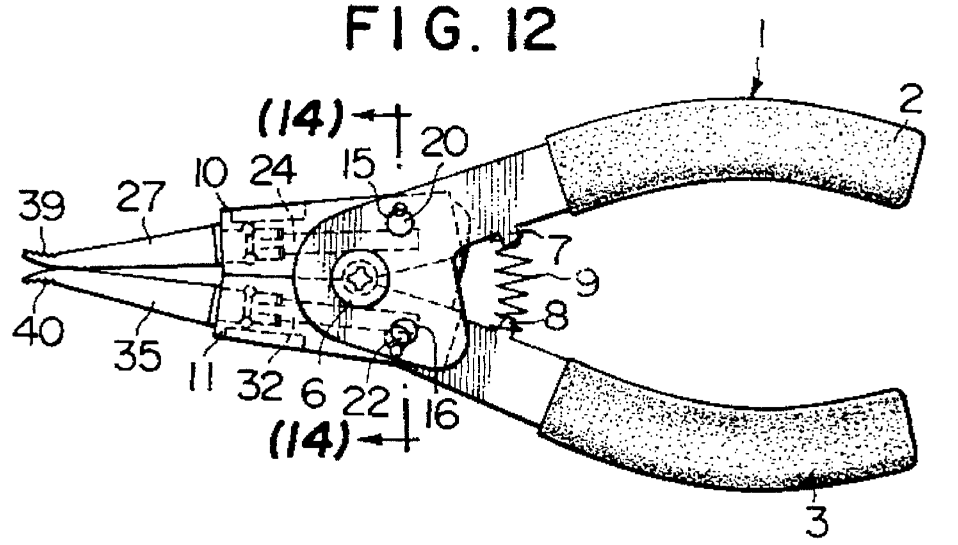
FIG. 12 is a plan view showing a second embodiment of a device for attaching/detaching a shaft snap ring and a hole snap ring according to the present invention, wherein the device is set up in the type for shaft application.
Figure 13:
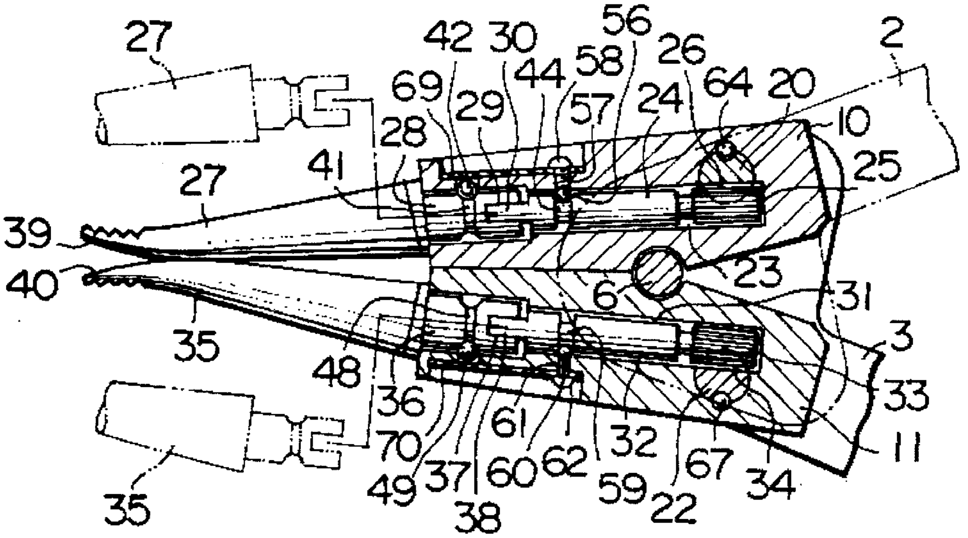
FIG. 13 is a partially enlarged plan view, with parts partially broken-away.
Figure 14:
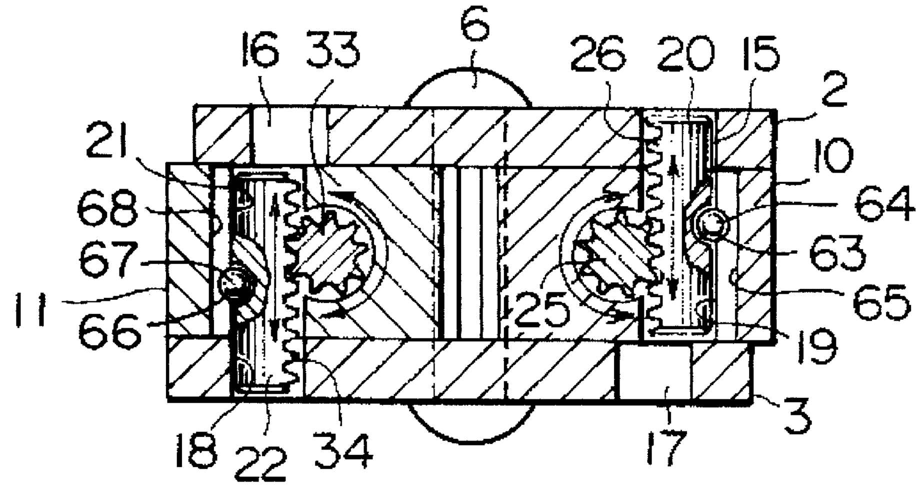
FIG. 14 is an enlarged vertical sectional view taken along the line (14)—(14) of FIG. 12.
Figure 15:
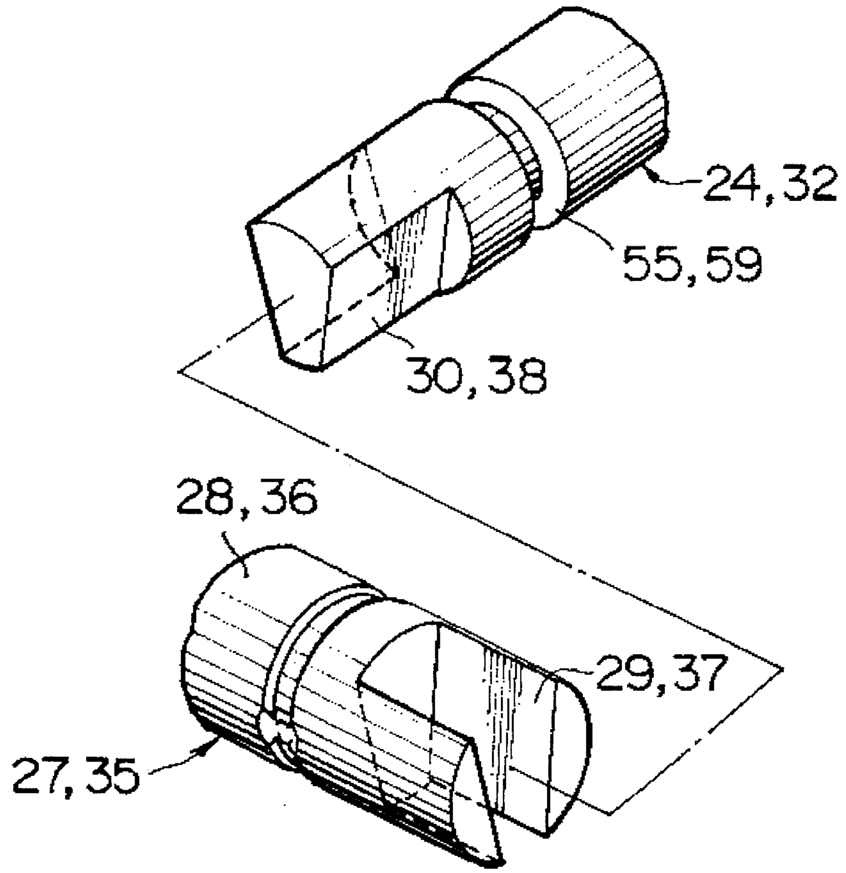
FIG. 15 is a partially enlarged perspective view showing the connecting relationship between a leading portion and a rotational shaft.

FIGS. 12 to 14 shows a state that the device 1 is set up for shaft application. Both the locking projections 39, 40 of the right and left leading portions 27, 35 are both directed outward, and the right movable pin 20 integrally connected with the right leading portion 27 is engaged with the pin hole 19 of the right operating lever 10 and the right engaging hole 15 of the right grasp lever 2, as a result of which the right leading portion 27 is integrally connected with the right grasp lever 2 by way of the right operating lever 10.

Meanwhile, the left movable pin 22 integrally connected with the left leading portion 35 is engaged with the pin hole 21 of the left operating lever 11 and the left engaging hole 18 of the left grasp lever 3, as a result of which the left leading portion 35 is integrally connected with the left grasp lever 3 by way of the left operating lever 11.

Thus, by an operation of grasping the right and left grasp levers 2, 3, inserting both the locking projections 39, 40 in the hole portions 101 of the shaft snap ring 100, and extending an interval between both the ends of the snap ring, the shaft snap ring can be attached/detached into/from a groove of a shaft surface.

Figure 16:
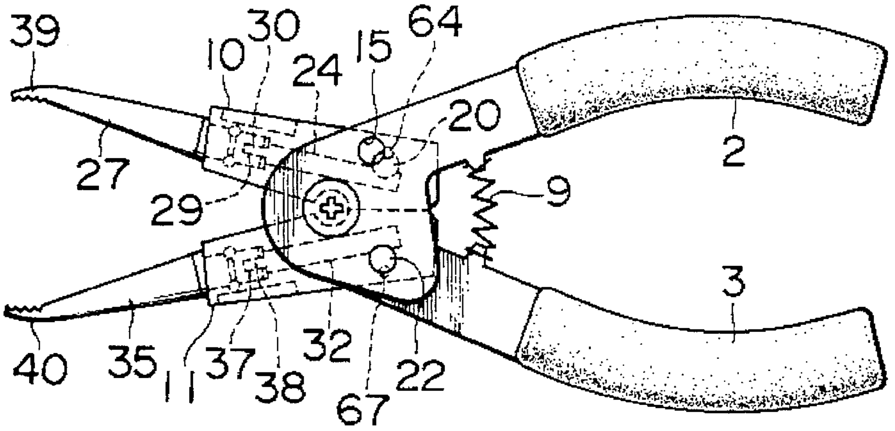
FIG. 16 is a partial plan view showing a state where the device shown in FIG. 12 is set up in the type for hole application.
Figure 17:
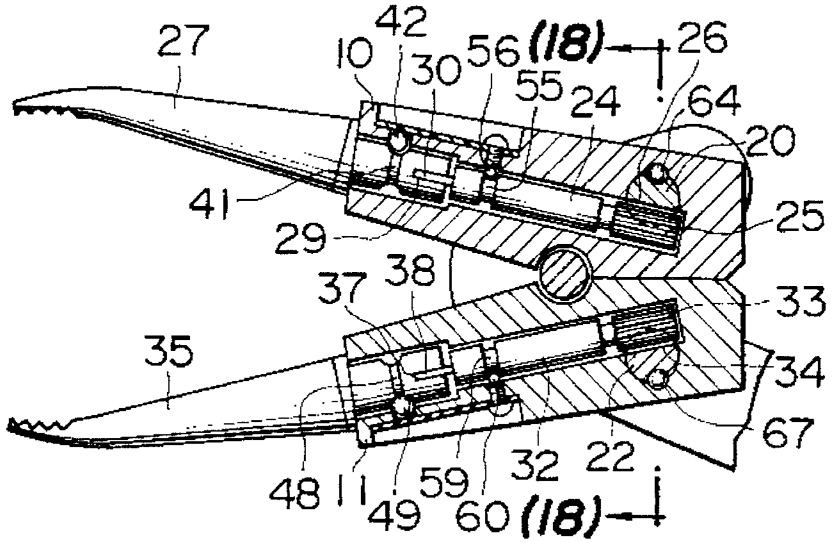
FIG. 17 is a partially enlarged plan view of the device shown in FIG. 12, with parts partially broken-away.
Figure 18:
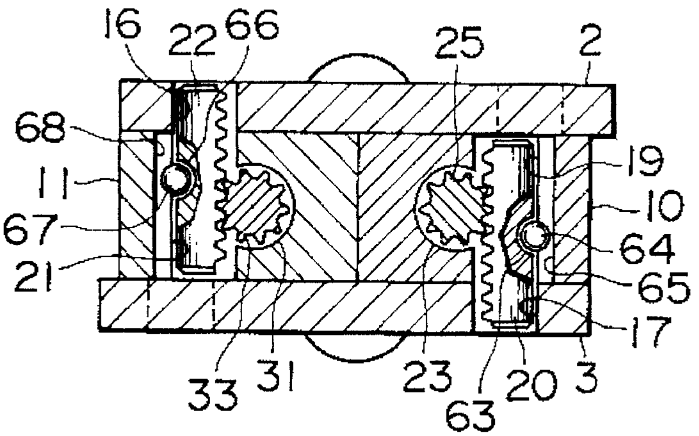
FIG. 18 is an enlarged vertical sectional view taken along the line (18)—(18) of FIG. 17.

FIGS. 16 to 18 show a state where the device is set up for hole application. In these figures, both the locking projections 39, 40 of the right and left leading portions 27, 35 are both directed inward, and the right movable pin 20 integrally connected with the right leading portion 27 is engaged with the pin hole 19 of the right operating lever 10 and the right engaging hole 17 of the left grasp lever 3, as a result of which the right leading portion 27 is integrally connected with the left grasp lever 3 by way of the right operating lever 10.

Meanwhile, the left movable pin 22 integrally connected with the left leading portion 35 is engaged with the pin hole 21 of the left operating lever 11 and the left engaging hole 16 of the right grasp lever 2, as a result of which the left leading portion 35 is integrally connected with the right grasp lever 2 by way of the left operating lever 11.

Thus, by an operation of grasping the right and left grasp levers 2, 3, inserting both the locking projections 39, 40 in the hole portions 111 of the hole snap ring 110, and narrowing an interval between both the ends of the hole snap ring 110, the hole snap ring can be attached/detached into/from a groove of a target hole surface.

Figure 19:
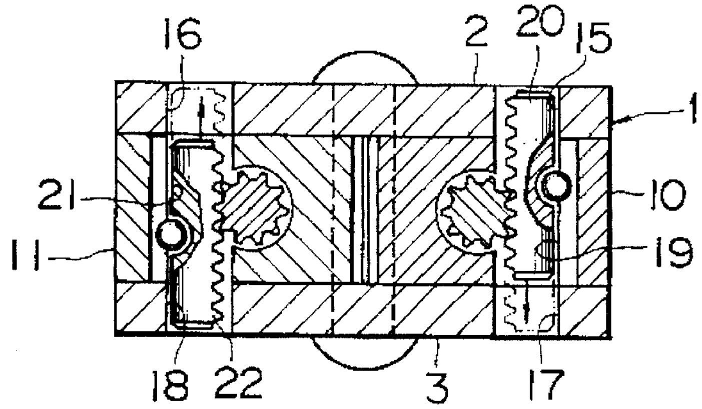
FIG. 19 is an enlarged vertical view showing a state where the device shown in FIG. 12 is changed to be used for hole or shaft application by turning the right and left leading portions.
Figure 20:
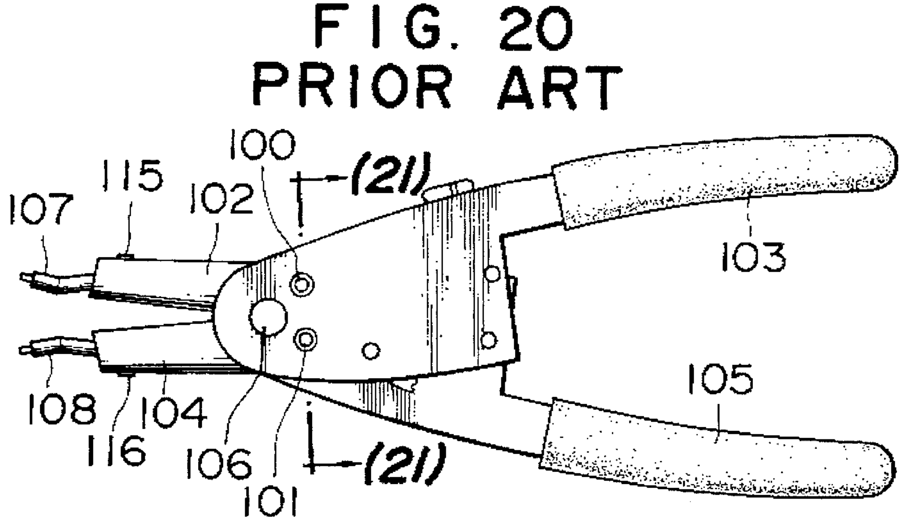
FIG. 20 PRIOR ART
FIG. 20 is a plan view showing a prior art device for attaching/detaching a snap ring.
Figure 21:
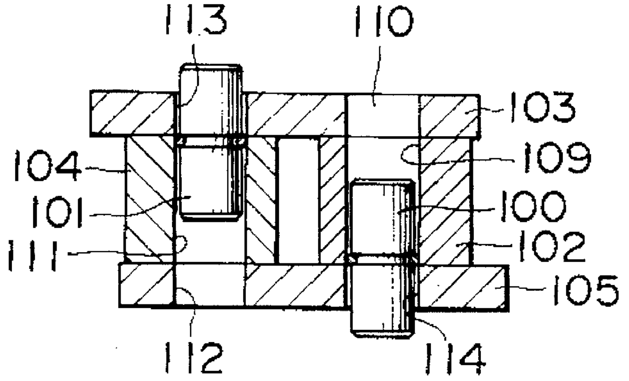
FIG. 21 PRIOR ART
FIG. 21 is an enlarged vertical sectional view taken along the line (21)—(21) of FIG. 20.

FIG. 19 shows a state where the device 1 can be switched between types for shaft and hole applications. In this figure, by an operation of grasping the right and left grasp levers 2, 3 such that the vertical position of the pin hole 19 corresponds to the vertical positions of the right engaging holes 15, 17 of the right and left grasp levers 2, 3, and the vertical position of the pin hole 21 corresponds to the vertical positions of the left engaging holes 16, 18 of the right and left grasp levers 2, 3, the right and left movable pins 20, 22 can be moved for switching by the rotation of the right and left leading portions 27, 35.

The second embodiment has the following effects, in addition to the same effects as those of the first embodiment: In the second embodiment, connection structures between engaging grooves 29, 37 of right and left leading portions 27, 35 and engaging projections 30, 38 of right and left rotational shafts 24, 32 are formed in a male-female relationship in which each connecting angle around the connecting axial line is specified such that the connections become possible only in a state where right and left locking projections 39, 40 of the leading portion 27, 35 are directed inward or outward. Accordingly, when the leading portions 27, 35 are inserted, if the connecting angles around the connecting axial line between the engaging grooves 29, 37 of the leading portions 27, 35 and the engaging projections 30, 38 of the rotational shafts 24, 32 are instable, the connections become impossible. In other words, only when the connecting angles around the connecting axial line is suitable, the connections are possible.

With this construction, even if an operator does not know the directional relationship of the locking projections 39, 40, he can suitably insert them. This makes it possible to prevent the artificial error, and to eliminate the fear that a snap ring is slipped and jumped off the locking projections 39, 40 due to the connecting error.

The slip-off preventive members 56, 60 project in the guide holes 23, 31 of the right and left operating levers 10, 11 and mesh with the annular grooves 55, 59 of the right and left rotational shafts 24, 32 for preventing the slip-off of the rotational shafts 27, 35 without any obstruction of the rotation thereof. Accordingly, even in the state where the leading portions 27, 35 are pulled out for exchange, the rotational shafts 24, 32 are prevented from being released from the guide holes 23, 31. Moreover, the slip-off preventive members 56, 60 act to position the rotational shafts 24, 32, so that the meshing state between the gear portions 26, 34 of the rotational shafts 24, 32 and the gear portions 25, 33 of the movable pins 20, 22 can be kept as initially set up. As a consequence, it becomes possible to speedily and easily exchange the leading portions 27, 35 without any slip-off or jump-off of the rotational shafts 24, 32, and to certainly mesh the gear portions 25, 33 of the movable pins 20, 22 with the gear portions 26, 34 of the rotational shafts 24, 32.

Since the rack portions 26, 34 of the right and left movable pins 20, 22 in the pin holes 19, 21 near the guide holes 23, 31 mesh with the gear portions 26, 34 of the right and left rotational shafts 24, 32, and the rolling elements 64, 67, in the locking slits 65, 68 which axially extend along the surfaces of the pin holes 19, 21 and which are formed in the opposite shape of the locking recesses 63, 66, are locked with the locking recesses 63, 66 on the side surfaces of the right and left movable pins 20, 22. Accordingly, the right and left movable pins 20, 22 are prevented from being rotated and slipped-off, and the gear portions of the movable pins 20, 22 are certainly meshed with the gear portions 26, 34 of the rotational shafts 24, 32, thus keeping the smooth meshing relationship therebetween.

Moreover, the movable pins 20, 22 are prevented from being rotated and slipped-off by the rolling elements 64, 67, so that the movable pins 20, 22 can be smoothly moved, and also the switching between the types for hole and shaft applications by the leading portions 27, 35 can be smoothly performed. Additionally, the connection between the rotational shafts 24, 32 and the movable pins 20, 22 is made by a method wherein the movable pins 20, 22 are positioned near the gear portions 26, 34 of the rotational shafts 24, 32 and the rotational shafts 24, 32 mesh with the rack portions 26, 34 on the side surfaces of the movable pins 20, 22, so that the rack portions 26, 34 of the movable pins 20, 22 can be easily and accurately formed.

As a modification of the above embodiment, the locking projections 39, 40 of the right and left leading portions 27, 35 may be directed perpendicularly to the axial line of the leading portions 27, 35 such that the snap ring is attached/detached in the state where the leading portions 27, 35 are directed perpendicularly to the axial line of a shaft or hole (not shown).

Several types of the leading portions 27, 35 having the locking projections 39, 40 with different diameters may be prepared in accordance with the sizes of the snap rings, and they may be selectively used in accordance with the attaching/detaching state of the snap ring and with the size of the snap ring. The right and left leading portions 27, 35 are preferably a forging part of Cr-V-steel.

Having described specific preferred embodiments of the invention with reference to the accompanying drawings, it is appreciated that the present invention is not limited to those precise embodiments, and that various changes and modifications can be effected therein by one of ordinary skill in the art without departing from the scope and spirit of the invention as defined by the appended claims.

What is claimed is:

1. A device for attaching/detaching a shaft snap ring and a hole snap ring, comprising:

a pair of right and left grasp levers;

a supporting shaft for rotatably supporting overlapped support portions of leading side portions of said grasp levers;

a spring crossing between said grasp levers for biasing root side portions of said grasp levers in a state being opened;

a pair of right and left operating levers, wherein root side portions thereof are interposed between said support portions of grasp levers, and intermediate portions of said root side portions are rotatably supported by said supporting shaft in such a manner as to be coaxial with said supporting shaft;

a right movable pin movably held in a pin hole of said right operating lever, which is capable of being engaged with either of left engaging holes of said support portions of said grasp levers;

a left movable pin movably held in a pin hole of said left operating lever, which is capable of being engaged with left engaging holes of said support portions of said grasp levers;

right and left rotational shafts rotatably contained in guide holes of said right and left operating levers, each of which has at its leading edge a portion to be connected, and has at its base end a gear portion meshing with a gear portion of each of said right and left movable pins in said pin hole; and a pair of right and left leading portions rotatably and removably inserted in said guide holes of said right and left operating levers, each of which has at its base end a connecting portion removably connected to said portion to be connected of said rotational shaft, and has at its leading edge a locking projection;

wherein said right and left leading portions are connected to said right and left movable pins in such a manner that when said locking projections are both directed inward, said right movable pin is moved in said pin hole of said right operating lever and is engaged with said pin hole of said right operating lever and said right engaging hole of said left grasp lever while said left movable pin is moved in said pin hole of said left operating lever and is engaged with said pin hole of said left operating lever and said left engaging hole of said right grasp lever; and wherein when said locking projections are both directed outward, said right movable pin is moved in said pin hole of said right operating lever and is engaged with said pin hole of said right operating lever and said right engaging hole of said right grasp lever while said left movable pin is moved in said pin hole of said left operating lever and is engaged with said pin hole of said left operating lever and said left engaging hole of said left grasp lever.

2. A device for attaching/detaching a shaft snap ring and a hole snap ring according to claim 1, wherein said device further comprises slip-off preventive members which project into said guide holes of said right and left operating levers and which mesh with annular groove portions of said right end left rotational shafts for preventing the slip-off of said rotational shafts without any obstruction of the rotation thereof; and wherein connection structures between said connecting portions of said right and left leading portions and said portions to be connected of said rotational shafts are formed in a male-female relationship in which each connecting angle around the connecting axial line therebetween is specified in such a manner that said leading portions can be connected to said rotational shafts only in a state where said right and left locking projections are both directed inward or outward.

3. A device for attaching/detaching a shaft snap ring and a hole snap ring according to claim 1, wherein rack portions of said right and left movable pins in said pin holes near said guide holes mesh with gear portions of said right and left rotational shafts, and rolling elements, in locking slits which axially extend along said pin holes and which are formed in the opposite shape to locking recessed portions, are locked with said locking recessed portions on said right and left movable pin sides without any obstruction of the axial movement of said movable pins, thereby preventing the rotation and slip-off of said right and left movable pins.

4. A device for attaching/detaching a shaft snap ring and a hole snap ring according to claim 1, which further comprises stoppers which project into said guide holes of said right and left operating levers and which are elastically locked with annular grooves of said shaft portion to be connected of said right and left leading portions without any obstruction of the rotation and the attachment/detachment of said leading portions.

5. A device for attaching/detaching a shaft snap ring and a hole snap ring according to claim 1, wherein said locking projection of each of said right and left leading portions is substantially curved in the range from its base portion to its leading edge along the rotational axial line.

* * * * *